May 18, 1926.
E. H. PIECZKO
ANIMAL TRAP
Filed Sept. 19, 1925
1,584,802
2 Sheets-Sheet 1
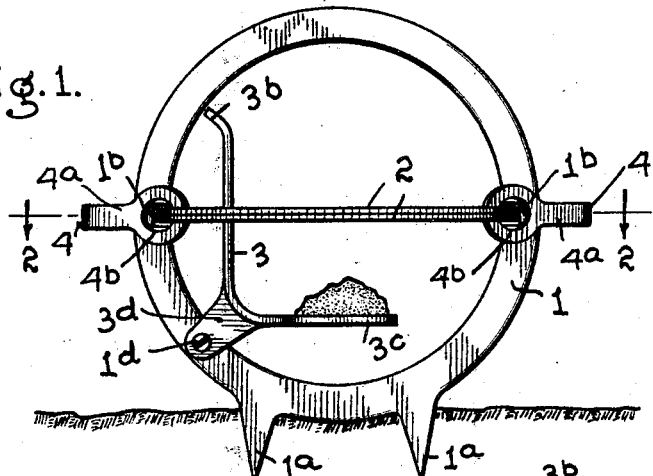
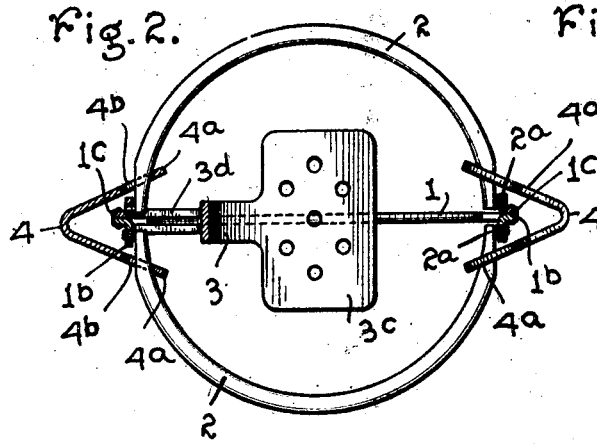
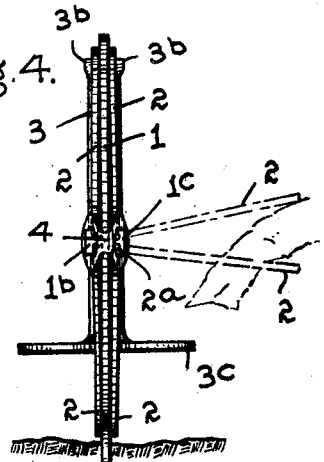
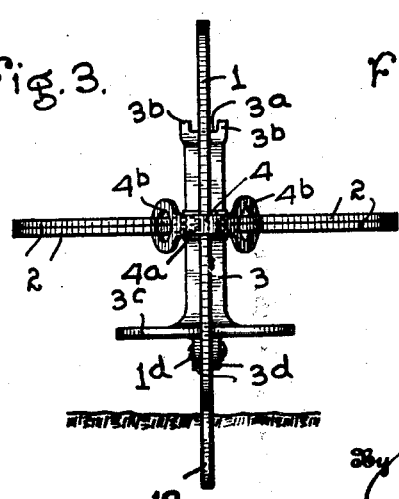
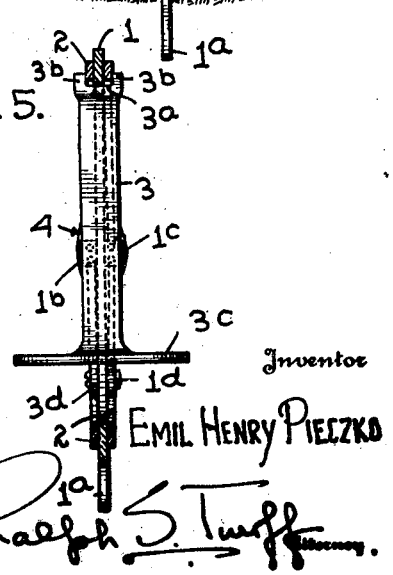
Inventor
EMIL HENRY PIECZKO
By Ralph S. Tuff May 18, 1926.

E. H. PIECZKO

ANIMAL TRAP

Filed Sept. 19, 1925      2 Sheets-Sheet 2

1,584,802

Inventor
EMIL HENRY PIECZKO

By Ralph S. Turoff
Attorney

Patented May 18, 1926.

1,584,802

UNITED STATES PATENT OFFICE.

EMIL HENRY PIECZKO, OF HAMMOND, INDIANA.

ANIMAL TRAP.

Application filed September 19, 1925. Serial No. 57,405.

This invention is a novel animal trap and is especially designed for the capture and killing of fur bearing animals. The invention provides an improved animal trap which will be strong and durable; will be reliable in action; will securely hold the animal captured therein; will be relatively compact and light; and can be easily handled, that is, set and baited.

In particular the invention provides a novel trap comprising a stationary frame with movable jaws mounted pivotally on each side thereof; novel means for securely holding the jaws in open or set position; novel means for holding the bait; and novel means for rigidly holding the jaws after the trap has been closed or sprung, thus preventing the escape or release of the animal captured and assuring the death thereof. The invention further provides novel means whereby when the trap is sprung capture is assured no matter from what direction approach is made. Further objects of the invention and novel features thereof will be hereinafter set forth.

The accompanying drawings illustrate one practical trap embodying the invention which will be described in detail to enable others to understand and use the same, but the invention is not considered restricted to the specific construction shown in the drawings, and reference is therefore had to the claims for summaries of the essentials of the invention and of the novel features of construction and of the novel combinations of parts for all of which protection is desired.

In the drawings:

Figure 1 is a front elevational view of the complete trap illustrating the jaws thereof in closed or sprung position.

Figure 2 is a horizontal sectional view on the line 2—2 of Figure 1.

Figure 3 is a side elevational view of the complete trap illustrating the jaws thereof in closed position.

Figure 4 is a side elevational view of the complete trap illustrating the jaws thereof in open or set position.

Figure 5 is a vertical sectional view through the complete trap also illustrating the jaws in open position.

Figure 6:
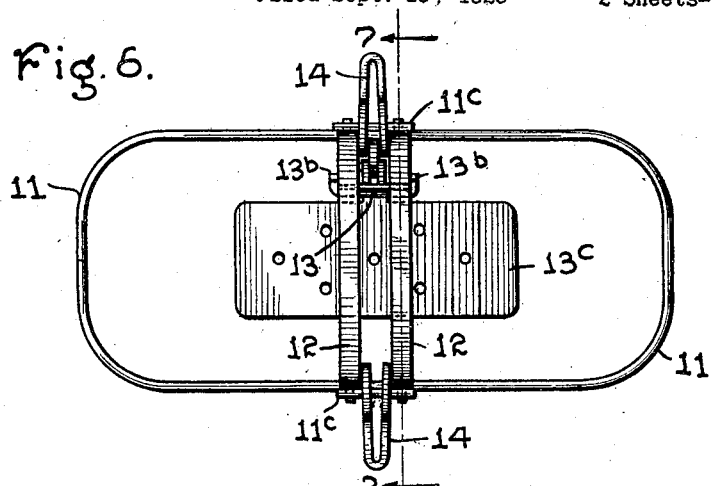
Figure 6 is a plan view of a modified form of trap, the jaws being illustrated in set position.

As shown in the drawings the trap comprises a stationary frame 1 which may be of any desired shape being illustrated as substantially circular, and may be of any desired size and strength to meet the particular requirements of the variety of trapping for which it is designed to be used. The frame is provided with a plurality of prongs or spikes $1^a$ at the base thereof for holding the trap in upright position. Preferably these prongs are formed integrally with the frame. Ears $1^b$ are struck up from the sides of the frame at the horizontal axis thereof and adjacent the said ears angle plates $1^c$ are secured to the opposite sides of the frame by any suitable means, as by welding rivets or the like. Each upstanding flange of the plates $1^c$ and each ear $1^b$ is provided with two circular apertures for a purpose to be hereinafter more fully described.

Jaws 2 are pivotally mounted upon the frame 1; four of these jaws being provided and being mounted in pairs, on each side of the frame. These jaws correspond in size, shape and relative strength to the frame so that when the jaws are in a position parallel thereto, each pair of said jaws will closely overlie opposite sides of the frame 1. In the present instance the jaws are illustrated as semi-circular in shape and are provided on their outer periphery adjacent the ends thereof with integral pivots $2^a$ adapted for the pivotal mounting of the jaws within the apertures or bearings in the ears $1^b$ and angle plates $1^c$.

Pivotally mounted upon the frame by any desired means as the screw $1^d$ is a trigger member 3 for holding the jaws in set position and releasing same when the trap is sprung. The trigger 3 comprises an upstanding arm notched as at $3^a$ to form shoulders $3^b$ the notch being of a sufficient width to hold the opposed jaws therein when the trap is set, as shown in Figure 5. The trigger is provided at the base thereof with an integral portion $3^c$ comprising a bait retaining pan. This pan is provided with apertures for securing the bait thereto by any desired means. The trigger is further provided with ears $3^d$ for pivotal mounting upon the frame as by the screw $1^d$.

It will be readily seen that any slight depression of the bait pan as by the placing of the paw of the marauding animal thereon will cause a forward movement of the trigger arm, resulting in the release of opposed jaws 2 from their set position within the jaw retaining notch $3^a$, thereby springing the trap. The upper jaw of each pair of jaws thus being released means are provided for simultaneously actuating each pair of jaws to snap them against each other into closed position, see Figures 1 to 3, and rigidly holding opposed pairs of jaws in said position.

This means comprises double action springs 4, substantially U-shaped, having opposed arms $4^a$, each arm having an aperture $4^b$ therein. In assembling the trap adjacent ends of each pair of jaws are passed through the aperture in one of the arms $4^a$, the ends of the opposite pair of jaws being passed through the other arm.

When the trap is in set position as shown in Figure 4, the spring 4 is compressed; and, upon the springing of the trap, the tension of the compressed spring acts to snap the upper and lower jaw of each pair against each other, holding them rigidly in this position or against any object which may be therebetween, as the paw of the captured animals as indicated in dotted lines in Figure 4. The jaws are then securely held in this position until release is permitted by the manual compression of the springs 4.

It will be readily understood that an animal desiring the bait will reach therefor with its paw or nose thereby depressing the bait pan $3^c$. This depression results, as above described, in the release of the jaws 2, which through the action of the springs 4 are snapped together with sufficient force to insure the capture and killing of the maurauding animal. Obviously through the employment of four jaws 2 no matter from what direction or angle the bait is approached, springing of the trap and capture of the animal will result. If desired and the nature of the variety of the trapping so requires the trap may be suitably concealed to render it invisible.

Figure 7:
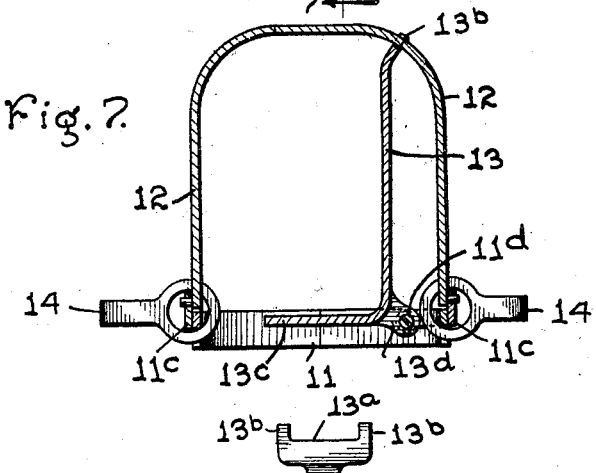
Figure 7 is a transverse sectional view taken on the line 7—7 of Figure 6.
Figure 8:
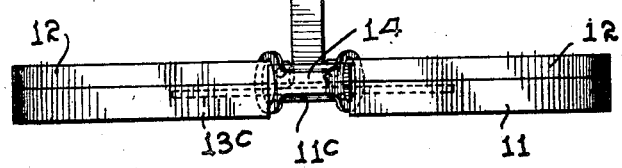
Figure 8 is a front elevational view of the modified form of trap the jaws thereof being illustrated in closed position.

In the modified form of trap as illustrated in Figures 6, 7, and 8, the frame 11 is substantially rectangular in shape and is provided with jaw holding plates $11^c$. The plates are provided with suitable apertures for the pivotal mounting of jaws 12. But two of these jaws are required, as the frame in this form of trap lies flat and serves as complementary halves of opposed jaws.

The trigger 13 is similar to the trigger 3 being pivotally secured to a lug on the frame by a screw $11^d$ passing through ears $13^d$ of the trigger. Shoulders $13^b$ formed by the notch $13^a$ are provided for retaining the jaws in set position and the trigger is provided with an integral bait holding pan $13^c$. Double action springs 14, identical with the springs 4, are provided for assuring proper springing of the trap and the retaining of the jaws in closed position; the frame 11 being recessed for the accommodation of these springs.

It will be readily understood that the operation of this modified form of trap is identical with the operation of the above described preferred form, the only difference therebetween being the resultant necessity for but two movable jaws with the use of a flat rather than a vertical type of trap.

Figure 9:
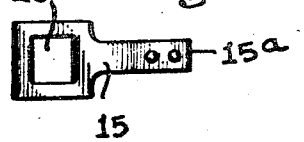
Figure 9 is a detail view of a modified form of actuating spring detached.

In Figure 9 there is illustrated a modified form of double action spring, consisting of opposed arms 15 secured as by rivets or the like $15^a$. The aperture $15^b$ may be of any desired shape, being illustrated as square.

There has thus been described a trap for fur-bearing animals, simple in operation and positive in action; a trap which can be economically manufactured yet will be strong and durable; and will assure the capture and humane killing of animals sought to be trapped.

The invention having thus been described what is claimed is:

1. A trap of the class described comprising a frame, movable pairs of jaws mounted on said frame, means for holding said pairs of jaws in set position, comprising an L shaped trigger pivotally mounted within said frame, the lower portion of said trigger comprising means for simultaneously releasing said pairs of jaws, the last named means comprising a bait retaining pan, and means for springing the trap and holding said pairs of jaws after release consisting of U shaped springs positioned upon and acting on adjacent extremities of opposed pairs of jaws.

2. In a trap of the class described, a frame, movable jaws mounted on said frame, an L shaped trigger mounted within said frame, said trigger comprising an upper portion with means for holding the jaws in set position and a lower portion integral with said upper portion with means for releasing said jaws, said last named means comprising a bait retaining pan, and means for springing the trap and holding said jaws after release.

3. In a trap of the class described, a frame, movable jaws mounted on opposed sides of said frame, an L shaped trigger pivotally mounted within said frame, said trigger comprising means for holding the jaws in set position at its upper portion and means for releasing said jaws at its integral lower portion, said last named means comprising a bait retaining pan and means for simultaneously springing the trap and holding said jaws after release consisting of U shaped springs positioned upon and acting simultaneously upon adjacent extremities of opposed jaws.

In testimony whereof he affixes his signature.

EMIL HENRY PIECZKO.